H. W. BUNDY.
STEERING WHEEL.
APPLICATION FILED JUNE 3, 1920.
1,381,964.
Patented June 21, 1921.
2 SHEETS—SHEET 1.
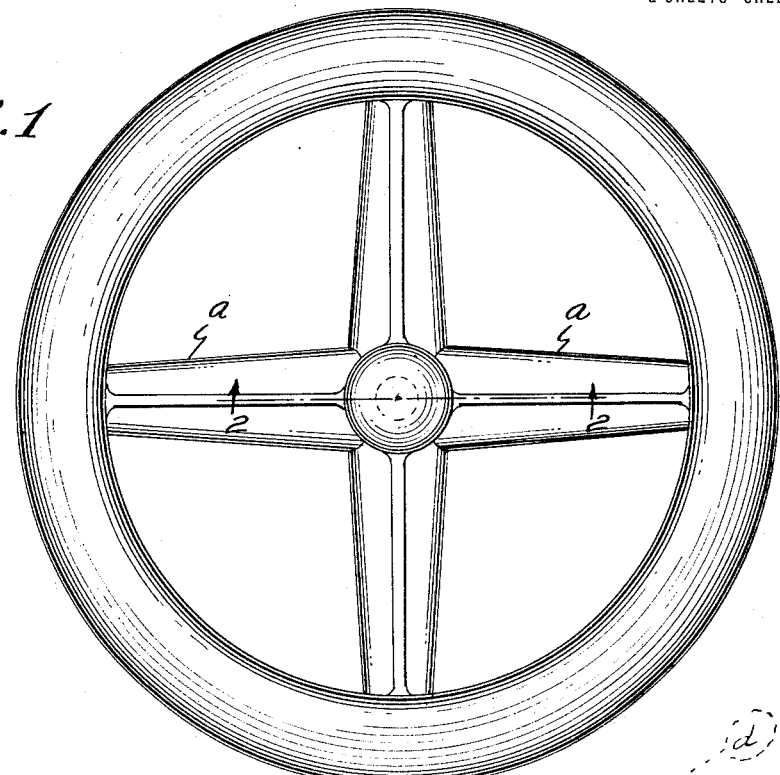
Fig. 1
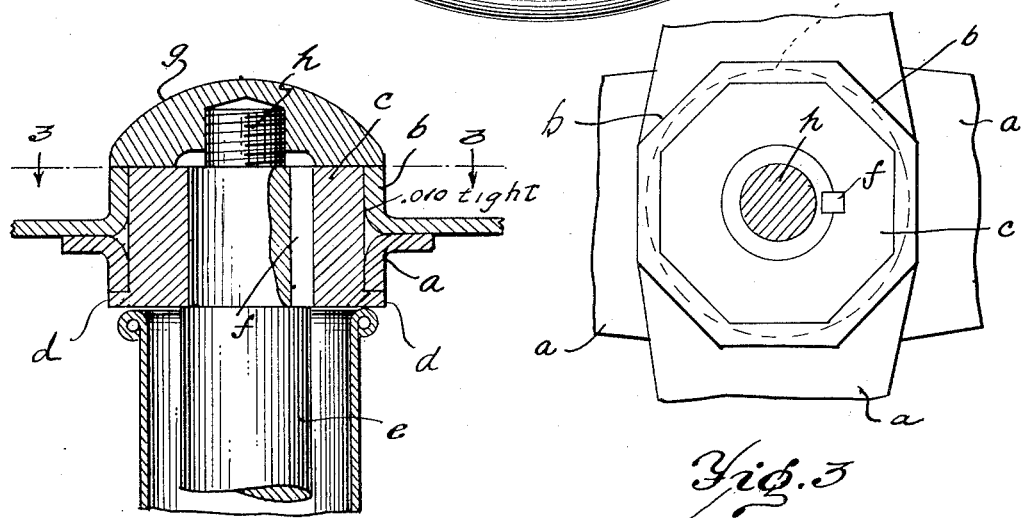
Fig. 2
Fig. 3
Inventor
Harry W. Bundy
By Stuart E. Barnes
Attorney

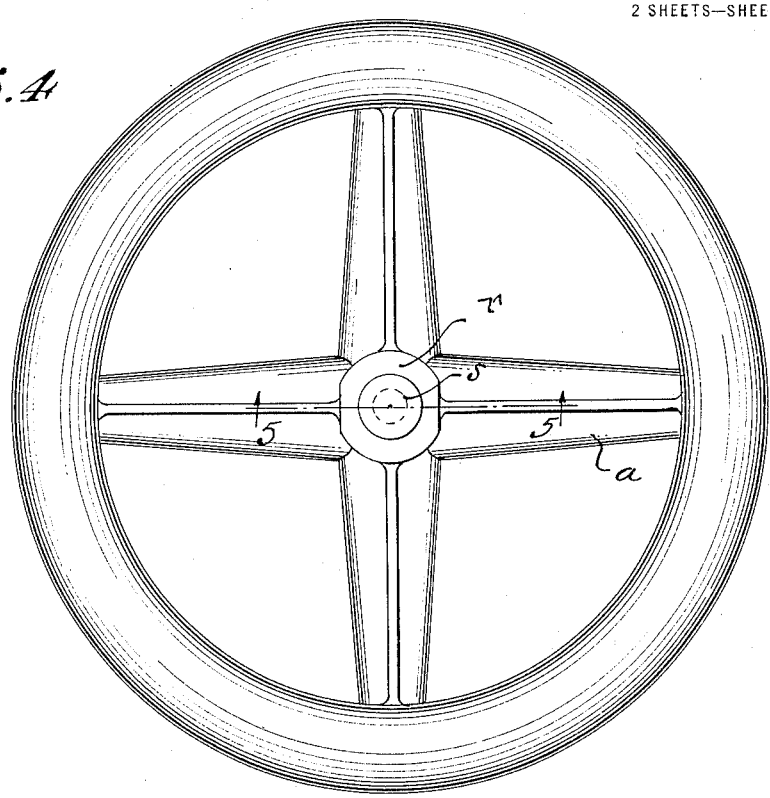
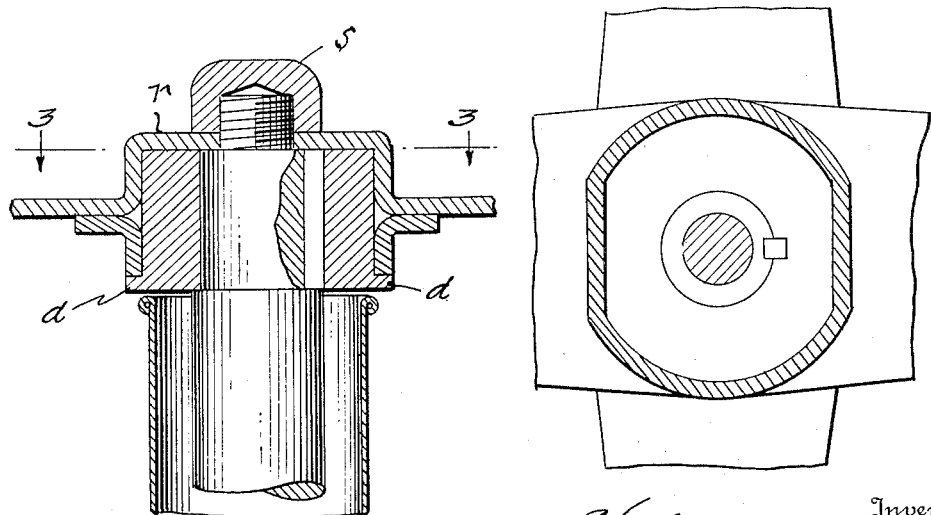

UNITED STATES PATENT OFFICE.

HARRY W. BUNDY OF DETROIT, MICHIGAN.

STEERING-WHEEL.

1,381,964.   Specification of Letters Patent.   Patented June 21, 1921.

Application filed June 3, 1920. Serial No. 386,172.

*To all whom it may concern:*

Be it known that I, HARRY W. BUNDY, a citizen of the United States, residing at Detroit, in the county of Wayne and State of Michigan, have invented certain new and useful Improvements in Steering-Wheels, of which the following is a specification.

This invention relates to steering wheels, and has for its object a steering wheel having a new form of spider and hub construction which makes a strong steering wheel that can be manufactured upon a large production scale at a relatively cheap figure.

In the drawings,—

Figure 1 is a plan view.

Fig. 2 is a section on the line 2—2 of Fig. 1.

Fig. 3 is a section on the line 3—3 of Fig. 2.

Fig. 4 is a plan view of a modified form.

Fig. 5 is a section on the line 5—5 of Fig. 4.

Fig. 6 is a section on the line 3—3 of Fig. 5.

The spider arms are designated $a$ and may be secured to the rim in any approved manner. The four spider arms are formed of two strips of metal that cross each other at the center and are each provided at the center with a central perforation and boss $b$ struck out of the metal. The central bosses $b$ are polygonal (Fig. 3) or non-circular. There is a hub piece $c$ that is provided with a hexagonal or polygonal exterior (Fig. 3)—(or such other non-circular shape as to fit the boss as in Fig. 6) at the upper end while the lower end forms a shoulder $d$. This hub piece $c$ is slotted and keyed to the spindle $e$ by the key $f$. The two strips or pairs of spider arms $a$ are secured to the tub piece $c$ by first fitting the underlying pair of arms over the hexagonal portion of the hub piece and then the overlying pair of spider arms $a$ is fitted over the non-circular portion of the hub piece by being forced thereover by the aid of suitable dies. The opening through the bossed portion of the overlying portion of arms is about 10/1000ths of an inch smaller than the diameter of the polygonal portion of the hub piece.

The polygonal or flatted character of the hub and spider arm openings serves to key the two together so one cannot rotate with respect to the other. The shoulder $d$ serves to hold the spider arms from sliding farther down on the hub while the forcing of the bosses $b$ having openings of smaller diameter than the exterior of the polygonal portion of the hub piece serves to hold the two arms tightly on the hub piece from movement upwardly with respect thereto. Also the cap nut $g$ screwing on the threads $h$ at the end of the spindle serves to hold the spider arms upon the hub piece.

The form shown in Figs. 4–6 is the same except that the polygonal cross section is replaced by circular cross section with flatted sides and the upper boss is turned over the end of the hub forming a retaining flange $r$ which does not require as large a nut. The smaller blind nut $s$ is used.

What I claim is:

1. A steering wheel, comprising a rim, a spindle provided with a threaded end, a plurality of strips of spider arms extending from side to side of the rim and overlapping at the center and provided with registering non-circular central openings and bosses, a hub piece provided with a non-circular upper portion for fitting complementarily into the openings through the said spider arm strips and provided with a shoulder at its base against which the overlapping spider arm strips can abut, and a nut adapted to screw on to the threaded end of the spindle and hold the overlapped spider arms from moving off from the hub piece.

2. A steering wheel, comprising a rim, a plurality of spider arm strips adapted to overlie at the center and having a central opening of non-circular cross section, a hub piece adapted to be passed through the said opening of the overlapping spider arm strips and provided with a non-circular upper exterior portion complementarily filling said non-circular opening, the upper spider arm having a central boss that engages about the hub sides and is turned over at the end of the boss to form a retaining flange that engages over the end of said hub.

3. A steering wheel, comprising a spindle, a rim, a plurality of strips extending from side to side of the rim to form spider arms, said strips being centrally apertured by openings of non-circular cross section, a hub piece having a non-circular exterior upper portion and a shoulder at its base against which the overlapping spider arm strips engage when the upper non-circular exterior portion is passed through the openings in the overlapping spider arm strips, the upper overlapping spider arm strip being provided with a flange portion turned over the end of the hub, the two strips being required to be forced thereover for locking the two overlapping spider arm strips to the hub piece, and a nut that runs on to the end of the spindle and holds the hub and spider to the spindle.

In testimony whereof I affix my signature.

HARRY W. BUNDY.